US012762250B2

(12) United States Patent
Wang et al.

(10) Patent No.: US 12,762,250 B2
(45) Date of Patent: Oct. 13, 2026

(54) SYSTEM AND METHOD FOR PREVENTING EXPLOITATION OF LARGE LANGUAGE

(71) Applicant: Harness Inc., San Francisco, CA (US)

(72) Inventors: Jisheng Wang, Palo Alto, CA (US); Naresh Agarwal, Bangalore (IN); Sanjay Nagraj, Dublin (IE)

(73) Assignee: Harness Inc., San Francisco, CA (US)

( * ) Notice: Subject to any disclaimer, the term of this patent is extended or adjusted under 35 U.S.C. 154(b) by 79 days.

(21) Appl. No.: 19/014,291

(22) Filed: Jan. 9, 2025

(65) Prior Publication Data

US 2026/0195459 A1 Jul. 9, 2026

(51) Int. Cl.
*G06F 21/57* (2013.01)
*G06F 40/30* (2020.01)

(52) U.S. Cl.
CPC ............ *G06F 21/577* (2013.01); *G06F 40/30* (2020.01)

(58) Field of Classification Search
CPC ............................... G06F 21/577; G06F 40/30
See application file for complete search history.

(56) References Cited

U.S. PATENT DOCUMENTS

2024/0333765 A1* 10/2024 McGrew ............... G06F 16/334
2025/0373526 A1* 12/2025 Sun ......................... H04L 43/04

* cited by examiner

*Primary Examiner* — Benjamin A Kaplan
(74) *Attorney, Agent, or Firm* — Jason A. Smith; Shumaker, Loop & Kendrick, LLP

(57) ABSTRACT

A method for preventing exploitation of large language models is disclosed. The method includes receiving and analyzing API calls, including user requests and LLM-generated responses, to detect vulnerabilities. The method uses an encoder-based model to flag suspicious API calls based on contextual analysis, assigns toxicity scores to responses for harmful content, evaluates plugin vulnerabilities for malware risks, and detects private data leaks using trained detection models. Then, a vulnerability detection model integrates flagged API calls, toxicity scores, assessed vulnerabilities, and detected data leaks to generate a comprehensive risk assessment. Based on this assessment, the method performs mitigation actions, including blocking flagged API calls or harmful responses, restricting access to sensitive data, and alerting users to potential leaks.

20 Claims, 7 Drawing Sheets

SYSTEM AND METHOD FOR PREVENTING EXPLOITATION OF LARGE LANGUAGE

BACKGROUND

Technical Field

The present disclosure relates to the field of application layer security, and particularly relates to a system and method for preventing exploitation of Large Language Models (LLMs).

Description of the Related Art

The Large Language Models (LLMs) have significantly advanced natural language processing by powering a range of applications such as virtual assistants, text generation tools, and automated customer support systems. These models, accessed via Application Programming Interfaces (APIs), are increasingly relied upon for sensitive and high-stakes tasks. However, their widespread use has revealed critical vulnerabilities, exposing organizations and users to a range of risks.

One prominent issue arises from prompt injection attacks, where malicious actors craft deceptive inputs to manipulate an LLM's outputs. Traditional security measures are inadequate in mitigating such attacks because they fail to recognize the nuanced and contextual manipulations these inputs exploit. This can lead to unauthorized behavior, such as generating harmful content, exposing sensitive information, or bypassing safety mechanisms embedded within the models. In addition to the prompt injection attacks, LLMs are also susceptible to generating toxic or inappropriate content. Despite advancements in training datasets, the inherent probabilistic nature of these models can result in outputs containing hate speech, harassment, or misinformation. Current solutions, which primarily involve fine-tuning models with pre-labeled datasets, fail to account for the dynamic and evolving contexts in which these systems operate, leaving room for harm and reputational damage to deploying organizations. Additionally, the integration of plugins and external systems further expands the attack surface for LLMs because plugins are often designed to extend LLM functionality and introduce vulnerabilities such as insecure code execution, insufficient access controls, and susceptibility to malware exploits. These risks are exacerbated by the lack of robust, real-time monitoring and vulnerability assessment mechanisms for such integrations.

Another critical challenge is the risk of private data leaks, where LLMs inadvertently expose sensitive information such as Personally Identifiable Information (PII), proprietary business data, or confidential communications. These leaks often occur due to gaps in data sanitization or through manipulation by malicious actors aiming to extract hidden or sensitive information. Current detection mechanisms, typically reliant on simple keyword matching or rule-based filters, are insufficient in identifying complex patterns indicative of private data exposure. Existing approaches to address such issues are fragmented and limited in scope, often focusing on isolated risks such as detecting toxic content or preventing plugin vulnerabilities. Thus, such solutions operate in silos and lack the ability to address the multi-faceted threats facing LLMs. The traditional methods also fail to adapt to the evolving nature of exploitation techniques, leaving significant security gaps unaddressed.

Therefore, there is a need for a system and method for preventing exploitation of the LLMs ensuring the safe and reliable operation of the LLMs in complex real-world scenarios, and overcomes the above-mentioned drawbacks.

BRIEF SUMMARY

One or more embodiments are directed to a system and method (together referred to as 'disclosed mechanism') for preventing exploitation of Large Language Models (LLMs). The disclosed mechanism safeguards the LLMs from malicious actors by a multi-layered defense approach, while ensuring the protection of sensitive data and the integrity of generated content. The disclosed mechanism provides a multi-layered defense approach by analyzing API calls to and from LLMs to detect exploitation risks and evaluating both incoming user requests and outgoing responses generated by the LLM to detect malicious patterns indicative of manipulation attempts, such as those commonly seen in prompt injection attacks.

Further, the disclosed mechanism employs a pre-trained transformer-based model to process the semantic context of each API call, flagging suspicious calls based on known malicious patterns and contextual cues. The disclosed mechanism also identifies harmful or inappropriate responses generated by the LLMs, using a fine-tuned model trained on labeled datasets, to assign a toxicity score to each response, classifying the content as toxic, harassing, hate speech, or safe, such that the responses with high toxicity scores can be flagged for review or blocked to prevent harm. Furthermore, the disclosed mechanism assesses the security of plugins integrated with the LLM, identifying potential vulnerabilities such as malware exploits or remote code execution risks. By analyzing the interactions between the LLM and its plugins, the disclosed mechanism pinpoints weaknesses and helps mitigate security risks. Additionally, the disclosed mechanism also detects sensitive data by analyzing the API calls for private data leaks. In order to detect sensitive data, the mechanism utilizes a detection model trained on datasets containing Personally Identifiable Information (PII) or proprietary data to identify when sensitive information is at risk of exposure during LLM interactions.

In an embodiment, the disclosed mechanism integrates the aforementioned multiple detection models i.e. malicious pattern detection, toxicity analysis, plugin vulnerability assessment, and sensitive data leak identification into a unified vulnerability detection framework. Such framework is utilized to generate a comprehensive assessment of each API call, prioritizing detected risks based on severity. Based on such comprehensive assessment, the disclosed mechanism performs real-time protective actions, such as blocking suspicious API calls, preventing harmful responses from being delivered to users, restricting access to sensitive data, or alerting users about potential data leaks.

An embodiment of the present disclosure relates to the system for preventing exploitation of the LLMs. The system includes a receiving module to receive one or more Application Programming Interface (API) calls directed to the one or more LLMs. Such one or more API calls include a request submitted by a user to the one or more LLMs, and/or a response generated by the one or more LLMs for the user.

In an embodiment, the system includes an analyzer module to analyze the one or more API calls to detect one or more exploitation risks. In an embodiment, the analyzer module includes a malicious pattern detector to process the received one or more API calls to generate feature vectors representing contextual meaning and intent of the corresponding API call for flagging suspicious API calls. The received one or more API calls are processed using an encoder-only transformer-based model pre-trained using at least prompt injection datasets. Further, the flagging of the suspicious API calls further includes detecting patterns indicative of malicious and unauthorized activities by comparing the generated feature vectors to known malicious patterns derived from prompt injection datasets, and flagging suspicious API calls based at least on the detected malicious patterns and the contextual meaning.

In an embodiment, the analyzer module includes a toxic content detector to analyze the received responses generated by the one or more LLMs and assign a toxicity score to each response flags a toxic response. Further, the flagging of the toxicity response includes the steps of analyzing the responses generated by the one or more LLMs for harmful and inappropriate content using a model fine-tuned with labeled datasets of toxic and non-toxic language, extracting features including keywords, tone, and/or inflammatory language to classify the analyzed responses into categories, including toxic, harassment, hate speech, and/or safe. Next, the flagging of the toxicity includes the steps of assigning the toxicity score to each response based on the classification, and comparing the toxicity score of each response with a predefined threshold, such that a response is flagged for further review if the toxicity score exceeds the predefined threshold.

In an embodiment, the analyzer module includes a plugin vulnerability detector to assess vulnerabilities associated with plugins integrated into the one or more LLMs. Such vulnerabilities include identifying potential malware exploits and remote code execution vulnerabilities. The plugin vulnerability detector further identifies vulnerabilities related to insecure input handling, insufficient access control, and/or remote code execution in the plugins integrated with the one or more LLMs. Further, the plugin vulnerability detector generates a vulnerability report that includes identified malware exploits and potential mitigation strategies for each assessed plugin.

In an embodiment, the analyzer module includes a sensitive data detector to analyze the received API calls for detecting private data leaks using a detection model trained using datasets including Personally Identifiable Information (PII), proprietary code, and/or proprietary data. Further, the sensitive data detector uses contextual analysis to identify patterns indicative of sensitive information exposure within the received API calls to detect the private data leaks.

In an embodiment, the system includes an action module to integrate, using a vulnerability detection model, flagged suspicious API calls, assigned toxicity score to each response, assessed vulnerabilities, and the detected private data leaks to generate a comprehensive assessment of the one or more API calls to prioritize detected risks for comprehensive protection of the one or more LLMs. Further, the generated comprehensive assessment is stored in a database for future analysis and iterative improvements in detecting exploitation risks.

Further, the action module performs blocking the flagged API calls, blocking harmful responses generated by the one or more LLMs, restricting user access to sensitive data, and/or alerting users to potential data leaks based on the generated comprehensive assessment of the one or more API calls. In one embodiment, the action module restricts user access to sensitive data by redacting portions of the corresponding generated responses identified as private data. In another embodiment, the action module assigns priority levels to the flagged suspicious API calls, harmful responses, and assesses vulnerabilities to optimize mitigation actions.

In yet another embodiment, the action module blocks flagged API calls based on a predefined threshold of malicious activity.

An embodiment of the present disclosure relates to the method for preventing exploitation of the LLMs. The method includes the steps of receiving one or more Application Programming Interface (API) calls directed to the one or more LLMs. Such one or more API calls include a request submitted by a user to the one or more LLMs, and/or a response generated by the one or more LLMs for the user. Further, the method includes the steps of analyzing the one or more API calls to detect one or more exploitation risks. In an embodiment, the analyzing further includes processing the received one or more API calls to generate feature vectors representing contextual meaning and intent of the corresponding API call for flagging suspicious API calls. The received one or more API calls are processed using an encoder-only transformer-based model pre-trained using at least prompt injection datasets. Further, the flagging of the suspicious API calls further includes detecting patterns indicative of malicious and unauthorized activities by comparing the generated feature vectors to known malicious patterns derived from prompt injection datasets, and flagging suspicious API calls based at least on the detected malicious patterns and the contextual meaning.

In an embodiment, the analyzing includes the steps of analyzing the received responses generated by the one or more LLMs and assign a toxicity score to each response flag a toxic response. Further, the flagging of the toxicity response includes the steps of analyzing the responses generated by the one or more LLMs for harmful and inappropriate content using a model fine-tuned with labeled datasets of toxic and non-toxic language, extracting features including keywords, tone, and/or inflammatory language to classify the analyzed responses into categories, including toxic, harassment, hate speech, and/or safe. Next, the flagging of the toxicity includes the steps of assigning the toxicity score to each response based on the classification, and comparing the toxicity score of each response with a predefined threshold, such that a response is flagged for further review if the toxicity score exceeds the predefined threshold.

In an embodiment, the analyzing includes the steps of assessing vulnerabilities associated with plugins integrated into the one or more LLMs. Such vulnerabilities include identifying potential malware exploits and remote code execution vulnerabilities. The method also identifies vulnerabilities related to insecure input handling, insufficient access control, and/or remote code execution in the plugins integrated with the one or more LLMs. Further, the method includes the steps of generating a vulnerability report that includes identified malware exploits and potential mitigation strategies for each assessed plugin.

In an embodiment, the analyzing includes analyzing the received API calls for detecting private data leaks using a detection model trained using datasets including Personally Identifiable Information (PII), proprietary code, and/or proprietary data. Further, the method uses contextual analysis to identify patterns indicative of sensitive information exposure within the received API calls to detect the private data leaks.

In an embodiment, the method includes the steps of integrating, using a vulnerability detection model, flagged suspicious API calls, assigned toxicity score to each response, assessed vulnerabilities, and the detected private data leaks to generate a comprehensive assessment of the one or more API calls to prioritize detected risks for comprehensive protection of the one or more LLMs. Further, the generated comprehensive assessment is stored in a database for future analysis and iterative improvements in detecting exploitation risks. Thereafter, the method includes the steps of performing blocking the flagged API calls, blocking harmful responses generated by the one or more LLMs, restricting user access to sensitive data, and/or alerting users to potential data leaks based on the generated comprehensive assessment of the one or more API calls.

In one embodiment, the method includes restricting user access to sensitive data by redacting portions of the corresponding generated responses identified as private data. In another embodiment, the method includes assigning priority levels to the flagged suspicious API calls, harmful responses, and assessed vulnerabilities to optimize mitigation actions. In yet another embodiment, the method includes blocking flagged API calls based on a predefined threshold of malicious activity.

The features and advantages of the subject matter here will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
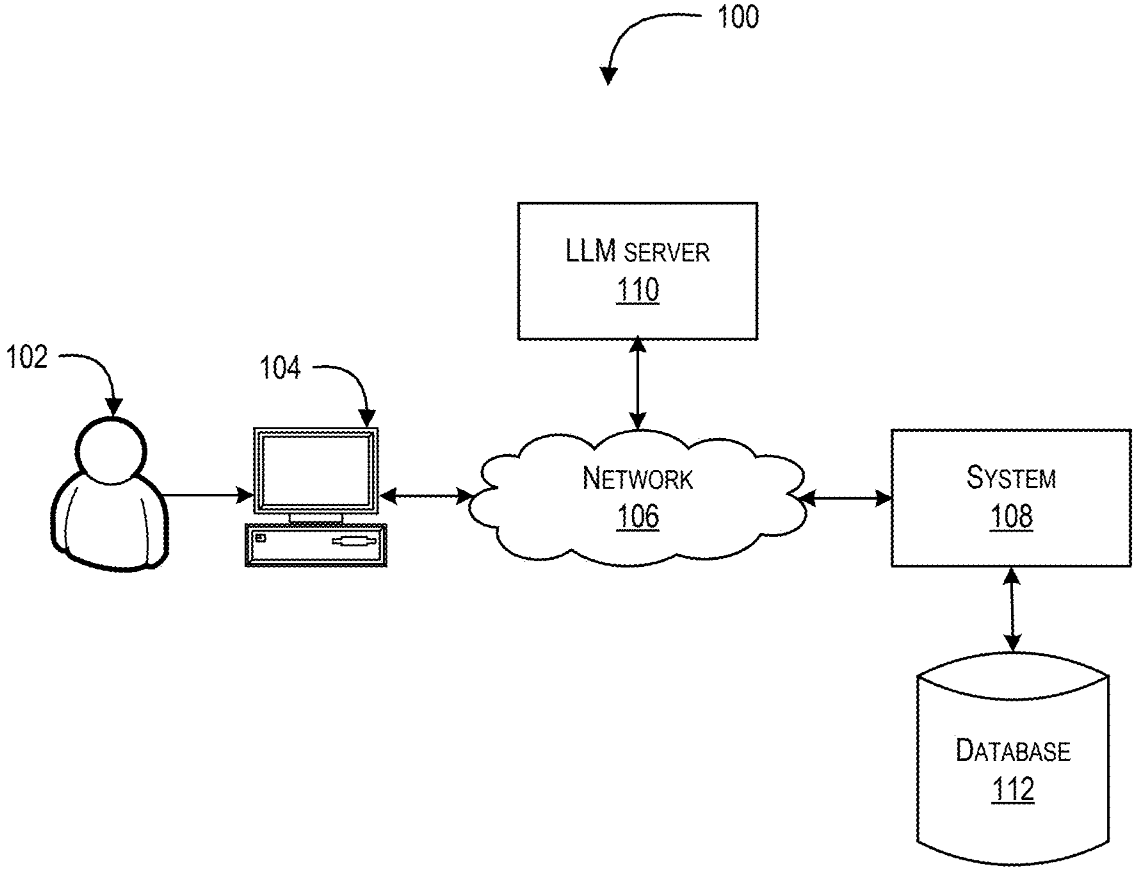
FIG. 1 illustrates an exemplary environment having a system for preventing exploitation of the LLMs, in accordance with an embodiment of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a system and method (together referred to as 'disclosed mechanism') for preventing exploitation of Large Language Models (LLMs). The disclosed mechanism safeguards the LLMs from malicious actors by a multi-layered defense approach, while ensuring the protection of sensitive data and the integrity of generated content. The disclosed mechanism provides a multi-layered defense approach by analyzing API calls to and from LLMs to detect exploitation risks and evaluating both incoming user requests and outgoing responses generated by the LLM to detect malicious patterns indicative of manipulation attempts, such as those commonly seen in prompt injection attacks.

Further, the disclosed mechanism employs a pre-trained transformer-based model to process the semantic context of each API call, flagging suspicious calls based on known malicious patterns and contextual cues. The disclosed mechanism also identifies harmful or inappropriate responses generated by the LLMs, using a fine-tuned model trained on labeled datasets, to assign a toxicity score to each response, classifying the content as toxic, harassment, hate speech, or safe, such that the responses with high toxicity scores can be flagged for review or blocked to prevent harm. Furthermore, the disclosed mechanism assesses the security of plugins integrated with the LLM, identifying potential vulnerabilities such as malware exploits or remote code execution risks. By analyzing the interactions between the LLM and its plugins, the disclosed mechanism pinpoints weaknesses and help mitigate security risks. Additionally, the disclosed mechanism also detects sensitive data by analyzing the API calls for private data leaks. In order to detect sensitive data, the mechanism utilizes a detection model trained on datasets containing Personally Identifiable Information (PII) or proprietary data to identify when sensitive information is at risk of exposure during LLM interactions.

In an embodiment, the disclosed mechanism integrates these multiple detection models i.e. malicious pattern detection, toxicity analysis, plugin vulnerability assessment, and sensitive data leak identification into a unified vulnerability detection framework. Such framework is then used to generate a comprehensive assessment of each API call, prioritizing detected risks based on severity. Based on such comprehensive assessment, the disclosed performs real-time protective actions, such as blocking suspicious API calls, preventing harmful responses from being delivered to users, restricting access to sensitive data, or alerting users about potential data leaks.

FIG. 1 illustrates an exemplary environment 100 having a system 108 for preventing exploitation of the LLMs, in accordance with an embodiment of the present disclosure.

In an embodiment, the exemplary environment 100 may include a user 102 with a corresponding user device 104, a network 106, the system 108, a LLM server 110, and a database 112. It may be apparent to a person skilled in the art that one user 102 and one user device 104 have been disclosed merely for the illustrative purpose and the environment 100 may include one or more users and one or more user devices without departing from the scope of the present disclosure. Further, the network 106 may correspond to a communication network), such as a direct interconnection, a Local Area Network (LAN), a Wide Area Network (WAN), a wireless network (e.g., using Wireless Application Protocol), the Internet, and the like. Further, the user devices 104 may be an electronic device capable of initiating communication with the LLM server 110 via the network 106 and may, without any limitation, include mobile phones, computers, laptops, tablets, or the like. Further, the LLM server 110 may host one or more Large Language Models that process the API calls received from the user device 104. The LLM server may include one or more computational nodes, such as cloud-based systems, edge computing nodes, or on-premises servers. The LLM server 110 may process the user's request, generates a response based on the provided input, and sends the response back to the user device 104. In one embodiment, the system 108 may be implemented on the LLM server 110 and the LLM server 110 may independently verify or secure API calls. In another embodiment, the system 108 may be implemented on the user device 104 or may be communicatively coupled to the network 106, such that the LLM server 110 does not independently verify or secure API calls, relying instead on the external system 108 for exploitation prevention to assess potential risks.

Further, the system 108 may be responsible for securing API calls between the user device 104 and the LLM server 110 by detecting and mitigating exploitation risks in both the user-provided requests and LLM-generated responses. In operation, the system 108 may receive API calls from the network 106 and analyze the API calls for potential exploitation risks using pre-trained models and advanced detection mechanisms. Such risks may, without any limitation, include malicious prompt injections, toxic content, plugin vulnerabilities, or sensitive data leaks. The system 108 may ensure secure communication and interaction with the LLM server by evaluating, flagging, and mitigating identified risks. Upon identifying any risk, the system 108 may take one or more actions, such as blocking suspicious API calls, modifying harmful LLM responses, or alerting users. Additionally, the system 108 may ensure that operational context and vulnerabilities are consistently monitored and updated to improve detection efficacy over time by storing the vulnerability reports in the database 112 for future uses. The database 112 may also include, without any limitation, datasets for training the detection models, logs of API calls, flagged suspicious requests or responses, detected vulnerabilities, and sensitive data patterns. Some non-limiting examples of the database 112 may include structured databases (e.g., SQL-based systems), unstructured databases (e.g., NoSQL), cloud-based storage, or hybrid systems. The database 112 may also include datasets of previously flagged patterns, toxicity thresholds, plugin vulnerability reports, and personally identifiable information (PII) schemas.

Figure 2:
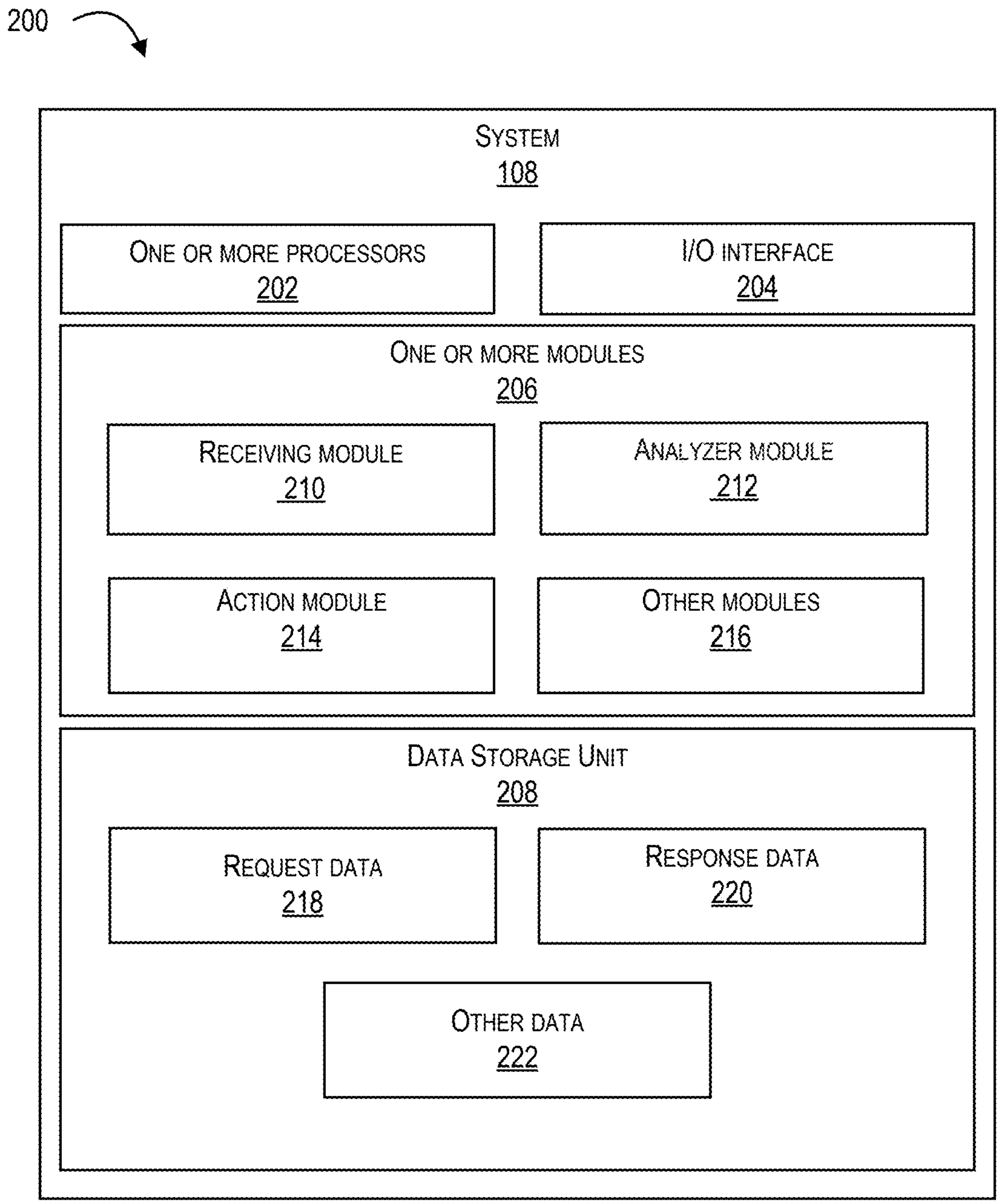
FIG. 2 illustrates a block diagram of the system for preventing exploitation of the LLMs, in accordance with an embodiment of the present disclosure.
Figure 3:
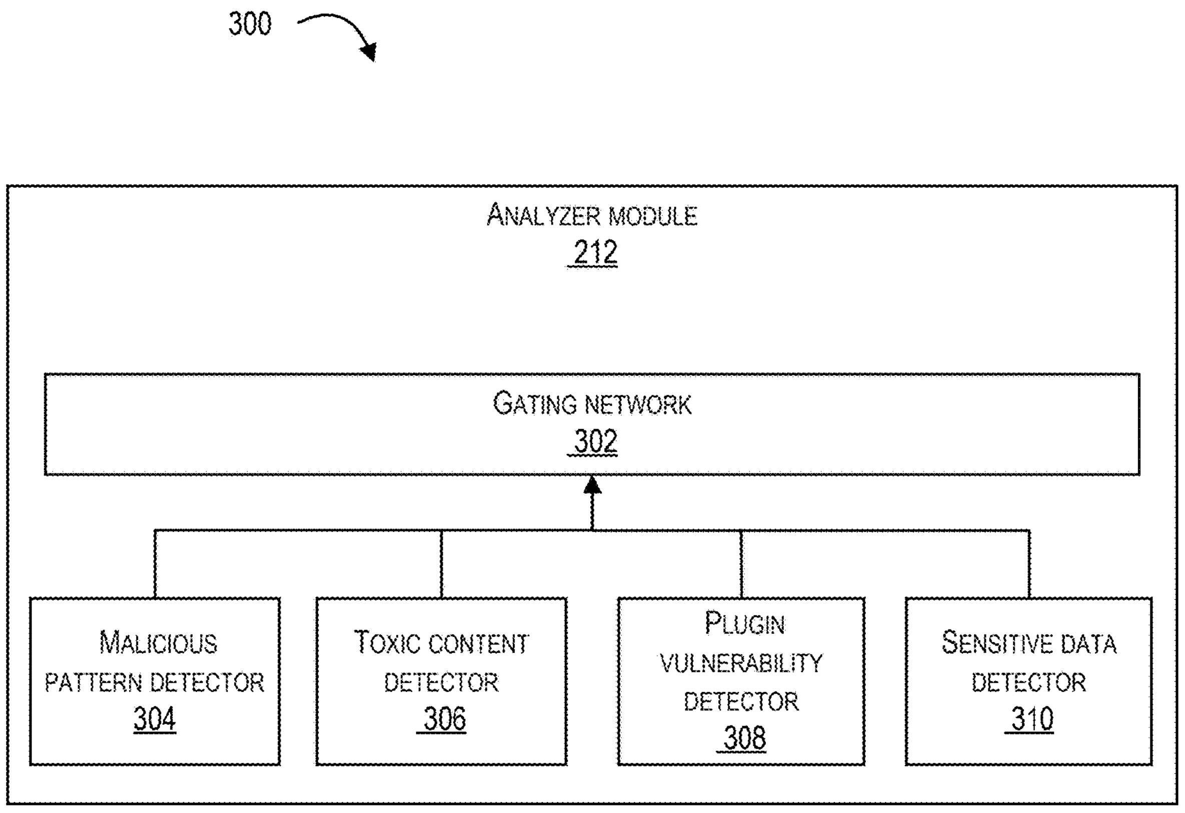
FIG. 3 illustrates a block diagram of an analyzer module, in accordance with an embodiment of the present disclosure.

FIG. 2 illustrates a block diagram 200 of the system 108 for preventing exploitation of the LLMs, in accordance with an embodiment of the present disclosure. FIG. 3 illustrates a block diagram 300 of an analyzer module 212, in accordance with an embodiment of the present disclosure. For the sake of brevity, FIGS. 2 and 3 have been explained together.

In an embodiment, the system 108 may include one or more processors 202, an Input/Output (I/O) interface 204, one or more modules 206, and a data storage unit 208. The one or more processors 202 may be implemented as one or more microprocessors microcomputers, microcomputers, digital signal processors, central processing units, state machines, logic circuitries, and/or any devices that manipulate signals based on operational instructions. Further, the I/O interface 204 may serve as the pivotal bridge connecting the internal processes of the system 108 with its external environment for facilitating the exchange of information between the system 108 and its users or external devices. Furthermore, the I/O interface 204 may contribute to the user experience by providing intuitive means for input, such as through keyboards or touchscreens, and presenting meaningful output via displays or other output devices. In an embodiment, the one or more modules 206 may include a receiving module 210, an analyzer module 212, an action module 214, and any other module 216 essential or required for the working of the system 108. In an embodiment, the data storage unit 208 may include request data 218 of the user, response data 220 by the LLM, and any other data 222 required for the working of the system 108. In an embodiment of the present disclosure, the one or more processors 202 and the data storage unit 208 may form a part of a chipset installed in the system 108. In another embodiment of the present disclosure, the data storage unit 208 may be implemented as a static memory or a dynamic memory. In an example, the data storage unit 208 may be internal to the system 108, such as an onside-based storage. In another example, the data storage unit 208 may be external to the system 108, such as cloud-based storage. Further, the one or more module 206 may be communicatively coupled to the data storage unit 208 and the one or more processor 202 of the system 108. The one or more processors 202 may be configured to control the operations of the one or more modules 206.

In an embodiment, the receiving module 210 may receive one or more Application Programming Interface (API) calls directed to the one or more LLMs associated with the LLM server 110. Such one or more API calls include a request submitted by the user 102 to the one or more LLMs (stored as request data 218), and/or a response generated by the one or more LLMs for the user 102 (stored as response data 220). Such requests and responses may be of various types, such as text-based prompts, file inputs, voice commands, and/or multimedia inputs. In addition to receiving the API calls, the receiving module 210 may also perform preliminary validation, such as ensuring proper formatting, syntax adherence, and compliance with access control mechanisms. Additionally, the receiving module 210 may not be limited to direct user interactions but may also handle system-generated API calls, such as automated requests from integrated systems or applications using the LLM services. In an embodiment, to ensure secure data transmission, the receiving module 210 may support encryption protocols such as HTTPS or Transport Layer Security (TLS).

In an embodiment, the analyzer module 212 may analyze the one or more API calls to detect one or more exploitation risks. The analyzer module 212 may be responsible for risk detection, utilizing advanced machine learning models, rule-based algorithms, and/or heuristic techniques to analyze the contextual and semantic attributes of the data. Further, the analyzer module 212 may be configured to process both the user-submitted requests and the LLM-generated responses to uncover vulnerabilities, unauthorized access attempts, and any indications of malicious intent. Additionally, the analyzer module 212 may be versatile, capable of working with a variety of data formats, including structured text, unstructured content, multimedia data, or a combination thereof. Further, the analyzer module 212 may operate in real-time or batch modes, allowing it to cater to high-velocity environments with rapid API interactions or scenarios requiring retrospective analysis. In addition to leveraging pre-trained models and existing datasets, the analyzer module 212 may be enhanced through continuous learning from feedback loops, integrating insights derived from historical data and emerging exploitation patterns.

In an embodiment, the analyzer module 212 may be explained in conjunction with FIG. 3. As illustrated, the analyzer module 212 may include a malicious pattern detector 304, a toxic content detector 306, a plugin vulnerability detector 308, and a sensitive data detector 310 gated together through a gating network 302 to work in tandem as a single framework by inter-depending on the analysis and outputs of one another. In an embodiment, the malicious pattern detector 304 may process the received one or more API calls to generate feature vectors representing contextual meaning and intent of the corresponding API call for flagging suspicious API calls. The received one or more API calls may be processed using an encoder-only transformer-based model pre-trained using at least prompt injection datasets, synthetic data, and real-world examples of malicious behavior to recognize both known and emerging threats. Further, the flagging of the suspicious API calls may include detecting patterns indicative of malicious and unauthorized activities by comparing the generated feature vectors to known malicious patterns derived from prompt injection datasets. Such comparisons may enable the malicious pattern detector 304 to detect manipulation attempts, such as crafted inputs designed to bypass safeguards or trigger unintended LLM behaviors. Further, the malicious pattern detector 304 flag the suspicious API calls based at least on the detected malicious patterns and the contextual meaning.

In an embodiment, the toxic content detector 306 may analyze the received responses generated by the one or more LLMs and assign a toxicity score to each response flag a toxic response. Further, the flagging of the toxicity response may include the steps of analyzing the responses generated by the one or more LLMs for harmful and inappropriate content. Such analysis may be performed using a model fine-tuned with labeled datasets of toxic and non-toxic language to extract features including keywords, tone, and/or inflammatory language to classify the analyzed responses into categories, including, without any limitation, toxic, harassment, hate speech, and/or safe. Next, the flagging of the toxicity may include the steps of assigning the toxicity score to each response based on the classification, and comparing the toxicity score of each response with a predefined threshold, such that a response is flagged for further review if the toxicity score exceeds the predefined threshold. Thus, the toxic content detector 306 may provide a nuanced analysis that allows for the identification of subtle toxicity forms, such as veiled insults, sarcasm with harmful intent, or culturally insensitive language. Further, the toxic content detector 306 may also supports multilingual and domain-specific content analysis, ensuring its applicability across diverse communication environments. Additionally, the toxic content detector 306 may incorporate real-time analysis to flag and process harmful content immediately, reducing potential exposure. In an embodiment, the toxic content detector 306 may be designed to adapt to evolving content moderation policies, allowing customization based on specific use cases such as workplace communication, educational content, or social media platforms.

In an embodiment, the plugin vulnerability detector 308 may assess and mitigate vulnerabilities associated with plugins integrated into the one or more LLMs. Such vulnerabilities may include identifying potential malware exploits and remote code execution vulnerabilities. The plugin vulnerability detector 308 may further identify vulnerabilities related to insecure input handling, insufficient access control, and/or remote code execution in the plugins integrated with the one or more LLMs. Further, the plugin vulnerability detector 308 may identify vulnerabilities by analyzing the behavior, functionality, and integration patterns of plugins, ensuring the LLM environment is protected from potential exploits and may examine the plugins for risks such as malware injection, insecure input handling, insufficient access controls, remote code execution vulnerabilities, and other forms of exploitative activities. Further, the plugin vulnerability detector 308 may generate a vulnerability report that includes identified malware exploits and potential mitigation strategies for each assessed plugin. In an embodiment, the plugin vulnerability detector 308 may operate by dynamically analyzing plugin interactions with the LLM, including requests, responses, and data handling mechanisms and may employ static code analysis, runtime behavioral analysis, and/or heuristic detection techniques to uncover vulnerabilities that could compromise the LLM's operations or expose sensitive information. Further, the plugin vulnerability detector 308 may access threat intelligence feeds or vulnerability databases to compare plugin characteristics against known exploit patterns, providing proactive detection of emerging threats.

In an embodiment, the sensitive data detector 310 may analyze the received API calls for detecting private data leaks using a detection model trained using datasets including Personally Identifiable Information (PII), proprietary code, and/or proprietary data (such as trade secrets, intellectual property, or the like). By leveraging detection models trained on comprehensive datasets, such as labeled samples of sensitive information, the sensitive data detector 310 may identify patterns indicative of sensitive data exposure. Such datasets may, without any limitation, include structured and unstructured examples of PII, proprietary documentation, and anonymized sensitive content, enabling the detector to generalize across various domains and data formats. Further, the sensitive data detector 310 may operate by analyzing the semantic and syntactic structures of received API calls and generated responses. Further, the sensitive data detector 310 may use contextual analysis to identify patterns indicative of sensitive information exposure within the received API calls to detect the private data leaks. For example, the sensitive data detector 310 may identify contextual patterns that suggest the presence of sensitive data, such as specific formatting (e.g., email addresses, social security numbers) or linguistic markers indicating confidential content.

In an embodiment, the action module 214 may integrate flagged suspicious API calls, assigned toxicity score to each response, assessed vulnerabilities, and the detected private data leaks to generate a comprehensive assessment of the one or more API calls to prioritize detected risks for comprehensive protection of the one or more LLMs. Such integration may be performed using a vulnerability detection model. Further, the generated comprehensive assessment is stored in the database 112 for future analysis and iterative improvements in detecting exploitation risks. Further, the action module 214 may perform blocking the flagged API calls, blocking harmful responses generated by the one or more LLMs, restricting user access to sensitive data, and/or alerting users to potential data leaks based on the generated comprehensive assessment of the one or more API calls. In one embodiment, the action module 214 may restrict user access to sensitive data by redacting portions of the corresponding generated responses identified as private data. In another embodiment, the action module 214 may assign priority levels to the flagged suspicious API calls, harmful responses, and assessed vulnerabilities to optimize mitigation actions. In yet another embodiment, the action module 214 may block flagged API calls based on a predefined threshold of malicious activity.

In an embodiment, the action module 214 may operate flexibly, enabling customization to suit diverse operational requirements and regulatory environments. The action module 214 may employ predefined thresholds, contextual priorities, and/or adaptive machine learning algorithms to decide the most appropriate actions. For example, flagged API calls with high-risk scores may trigger immediate blocks, while less critical issues may prompt warnings or logging for later review. Similarly, harmful responses may be entirely blocked, redacted to remove problematic content, or rephrased to maintain communication continuity without exposing vulnerabilities. Moreover, the action module 214 may support integration with external systems, such as incident management tools, logging frameworks, or compliance tracking systems ensuring that actions are not only executed in real time but also recorded for audit and accountability purposes.

Figure 4A:
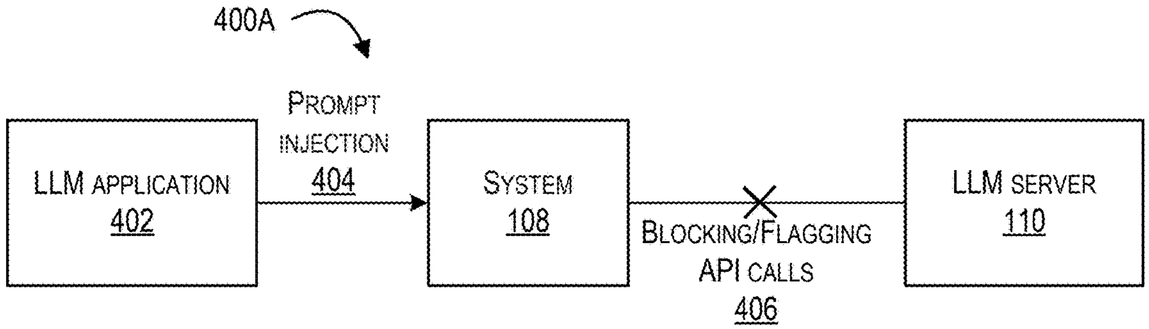
FIG. 4A illustrates an operation of blocking suspicious API calls, in accordance with an embodiment of the present disclosure.
Figure 4B:
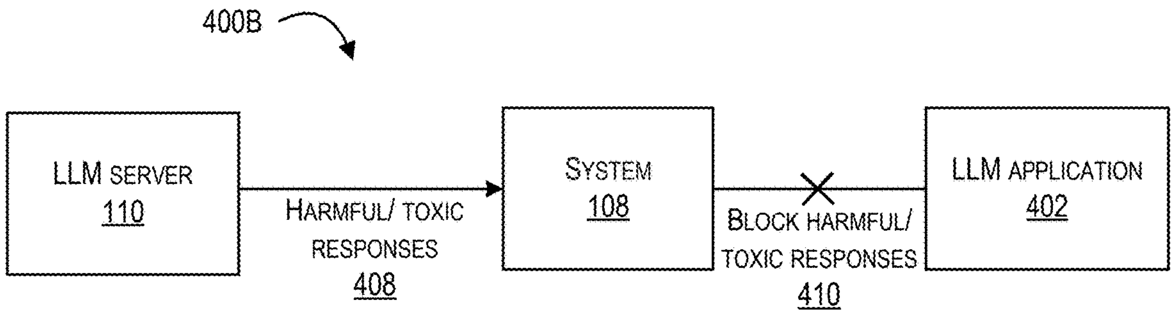
FIG. 4B illustrates an operation of blocking toxic responses, in accordance with an embodiment of the present disclosure.
Figure 4C:
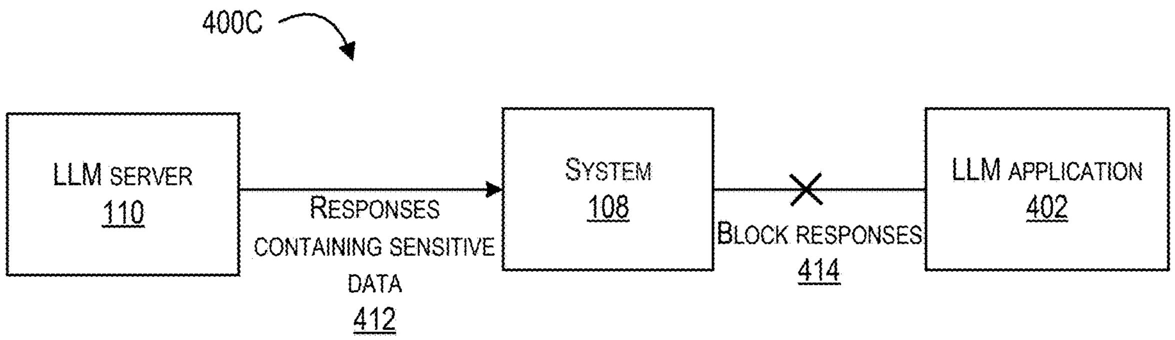
FIG. 4C illustrates an operation of blocking sensitive data, in accordance with an embodiment of the present disclosure.
Figure 4D:
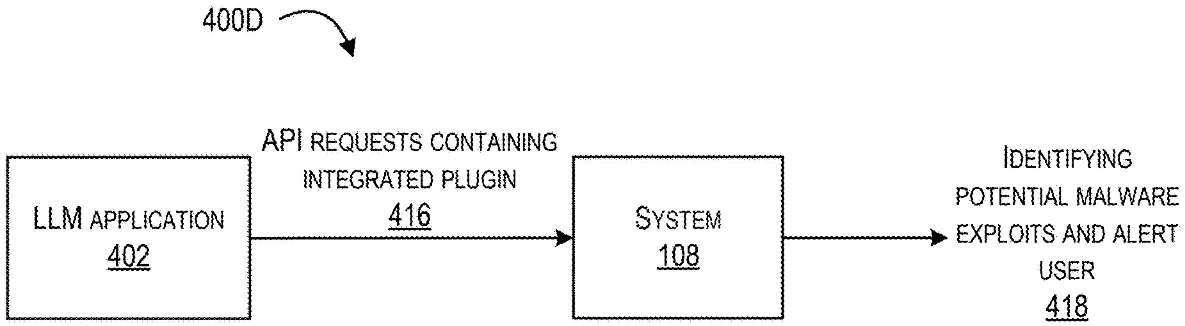
FIG. 4D illustrates an operation of identifying potential malware exploits, in accordance with an embodiment of the present disclosure.
Figure 5:
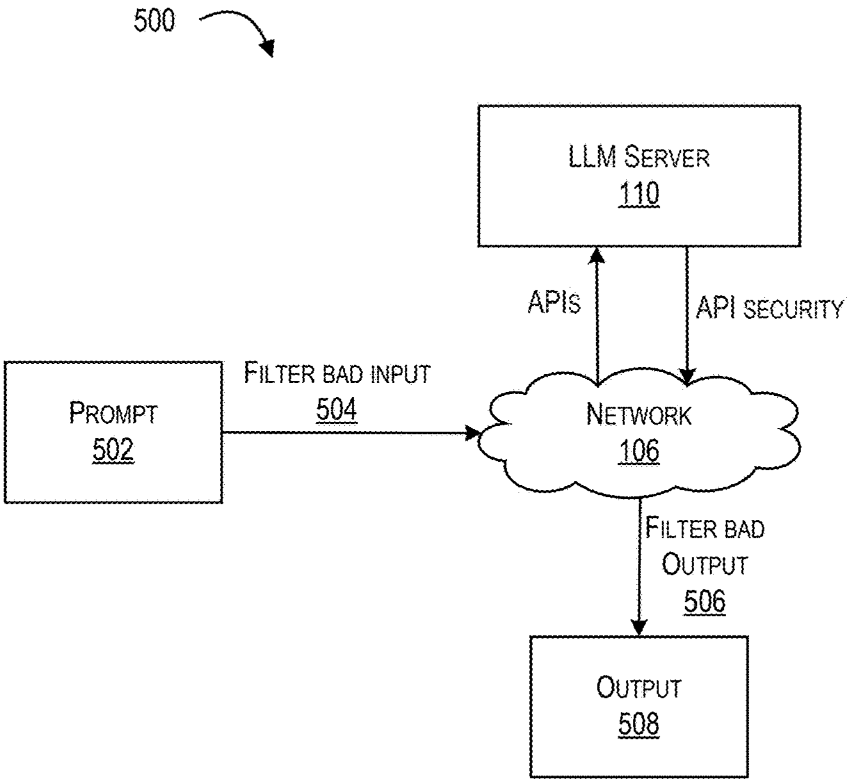
FIG. 5 illustrates an operation of preventing the exploitation of the one or more LLMs, in accordance with an embodiment of the present disclosure.

FIG. 4A illustrates an operation 400A of blocking suspicious API calls, in accordance with an embodiment of the present disclosure. FIG. 4B illustrates an operation 400B of blocking toxic responses, in accordance with an embodiment of the present disclosure. FIG. 4C illustrates an operation 400C of blocking sensitive data, in accordance with an embodiment of the present disclosure. FIG. 4D illustrates an operation 400D of identifying potential malware exploits, in accordance with an embodiment of the present disclosure. FIG. 5 illustrates an operation 500 of preventing the exploitation of the one or more LLMs, in accordance with an embodiment of the present disclosure. For the sake of brevity, FIGS. 4A, 4B, 4C, 4D, and 5 have been explained together.

In an embodiment, as illustrated in FIG. 4A, the system 108 may block suspicious API calls to prevent the exploitation of the LLMs. In the depicted environment, a user device 104 may initiate communication with an LLM application 402 by sending an input request, such as a query or command, via the network 106. Such request, referred to as an Application Programming Interface (API) call, is directed to the LLM server 110 that hosts the model. In the scenario shown, the API call includes a prompt injection attack 404 i.e., an attempt by the user 102 to manipulate the behavior of the LLM through specially crafted input. Thus, the API call, before reaching the LLM server 110, is intercepted by the system 108 integrated within the communication pathway. The system 108 identifies and examines the API call for potential exploitation risks. Specifically, the malicious pattern detector 304 may process the API call to extract contextual meaning and detect features indicative of prompt injection or other malicious activities. Then, the malicious pattern detector 304 may compare the extracted features with known patterns derived from pre-trained models or datasets of prompt injection attempts. In a scenario, if the malicious pattern detector 304 identifies the API call as suspicious, the system 108 blocks/flags the call for further action. The action module 214, upon receiving this flagged notification, executes appropriate protective measures. In the operation shown, the action module 214 actively blocks the flagged API call, as shown by 406, preventing it from reaching the LLM server 110. Thus, the system 108 ensures that the malicious input cannot influence or exploit the underlying LLM. Simultaneously, the system 108 may log the incident or notify an administrator for further review and investigation.

In an embodiment, as illustrated in FIG. 4B, the system 108 may block harmful or toxic responses to prevent the exploitation of the LLMs. In the depicted environment, the user device 104 may interact with the LLM application 402 hosted on the LLM server 110. The user 102 may submit an input query or prompt via the LLM application 402, which the LLM server 110 may process to generate a corresponding response. However, in this scenario, the response generated by the LLM contains harmful or toxic content 408, such as offensive language, hate speech, harassment, or other inappropriate elements. Before the toxic response is delivered to the LLM application 402 on the user device 104, it is intercepted by the system 108 integrated within the communication flow. The system 108 captures the response generated by the LLM server 110 and the toxic content detector 306 may process the response to identify any potentially harmful elements. As explained above, the toxic content detector 306 may use a model fine-tuned on labeled datasets of toxic and non-toxic content to extract features such as tone, specific keywords, inflammatory language, and contextual cues. It assigns a toxicity score to the response, representing the likelihood of it being harmful. In a scenario, if the toxicity score exceeds a predefined threshold or if specific harmful classifications (e.g., hate speech or harassment) are detected, the system 108 flags the response as toxic. The action module 214, upon receiving this flagged notification, performs the necessary mitigation actions. In the operation shown, the action module 214 blocks the flagged toxic response, as shown by 410, ensuring that flagged toxic response does not reach the LLM application 402 on the user device 104. Thus, the system 108 protects the end user from exposure to harmful or inappropriate content.

In an embodiment, as illustrated in FIG. 4C, the system 108 may block responses containing sensitive data in an environment utilizing the LLMs. As illustrated, the user device 104 may interact with the LLM application 402 hosted on the LLM server 110. The user 102 may submit a query LLM application 402, and the LLM server 110 may process the query to generate a response. However, the generated response inadvertently includes sensitive information, as shown by 412, such as Personally Identifiable Information (PII), proprietary code, or confidential organizational data, posing a significant risk of data leakage or privacy breaches. Before the sensitive response reaches the LLM application 402 on the user device 104, it is intercepted by the system 108 integrated into the communication flow. The system 108 may capture the response generated by the LLM server 110 and the sensitive data detector 310 may processes the response to identify any instances of sensitive data. The sensitive data detector 310 may utilize pre-trained models and contextual analysis techniques, leveraging datasets containing patterns indicative of sensitive information, such as PII, proprietary data structures, or common formats of confidential data. Further, the sensitive data detector 310 may evaluate the response, extracting features such as specific patterns (e.g., email addresses, credit card numbers), contextual relevance, and semantic meaning. In a scenario, if the sensitive data detector 310 identifies information deemed confidential or sensitive based on predefined criteria, it flags the response as containing sensitive data. Upon receiving this flagged notification, the action module 214 may initiate appropriate mitigation measures. In the operation shown, the action module 214 may block the flagged response, as shown by 414, preventing the flagged response from being delivered to the LLM application 402 on the user device 104. Thus, the system 108 ensures that sensitive information is not exposed to unauthorized users or external systems.

In an embodiment, as illustrated in FIG. 4D, the system 108 may identify potential malware exploits associated with plugins integrated into an LLM-enabled application 402. In the illustrated scenario, the user device 104 may interact with the LLM application 402 that may include various third-party plugins to enhance its functionality. The LLM application 402 may generate the API requests containing plugin-related data, as shown by 416, and transmit the API request to the LLM server 110 via the system 108 for processing. However, the plugins may harbor vulnerabilities, such as insecure input handling, insufficient access controls, or susceptibility to remote code execution, which pose significant security risks. As shown, the system 108 may intercept such API requests and the plugin vulnerability detector 308 may process the plugin-related data embedded in the API requests. The plugin vulnerability detector 308 may equipped with sophisticated algorithms and pre-trained models designed to analyze plugin behaviors, configurations, and metadata for signs of potential exploitation. Thus, the plugin vulnerability detector 308 may examine the plugins for vulnerabilities using various non-limiting methods, such as signature-based detection to identify known malware patterns, heuristic analysis to evaluate abnormal behaviors, and static or dynamic analysis of the plugin code. For instance, the plugin vulnerability detector 308 may identify suspicious code segments indicative of malware injection, backdoors, or privilege escalation mechanisms. The plugin vulnerability detector 308 may also analyze the plugin's network activity for unauthorized data exfiltration attempts or identify weak encryption methods in the plugin's implementation. Once the plugin vulnerability detector 308 may identifies potential exploits, as shown by 418, the system 108 may generate a detailed vulnerability report that categorizes the risks associated with the analyzed plugins. Such report may include descriptions of detected exploits, the level of severity, and potential consequences if exploited. Based on this analysis, the system 108 may alerts the user or an administrator through an appropriate notification mechanism, such as an in-app alert, email, or dashboard notification.

In an embodiment, as illustrated in FIG. 5, the system 108 may prevent the exploitation of one or more LLMs by employing a comprehensive filtering and analysis mechanism. The system 108 may operate within an environment where various prompts and responses are exchanged between users 102 and the LLM server 110, emphasizing proactive security at both the input and output levels. Initially, a prompt 502, representing a user-submitted query or instruction intended for the LLM may be transmitted through the network 106, where the system 108 performs an initial filtering operation, denoted as filter bad input 504. Such filtering may mitigate malicious activities such as prompt injections or unauthorized API calls. Further, the system 108 may analyze the prompt 502 using advanced detection techniques to identify patterns indicative of security threats, including prompt injection attacks, suspicious command execution attempts, or unauthorized API manipulations. Any identified harmful prompts 502 are blocked or flagged for further review, ensuring that only safe inputs reach the LLM server 110.

Once the filtered inputs are processed, the inputs may be forwarded to the LLM server 110, where the LLM processes the received APIs to generate appropriate responses. The LLM server 110 may handle requests and generate outputs based on its trained data and integrated plugins. As the server operates, the system 108 may also exchange API Security information with the LLM server 110 to enhance its detection capabilities, maintaining a secure communication loop between the LLM server 110 and the network 106, such that any anomalies in API calls, plugin vulnerabilities, or detected threats are reported and mitigated dynamically.

Following the LLM's processing, an output 508 may be generated and the system 108 performs an additional filtering operation, labeled as filter bad output 506, such that harmful or inappropriate responses generated by the LLM are identified and blocked. Additionally, the system 108 may evaluate the content for toxicity, harmful intent, or private data exposure and advanced models and predefined thresholds, as explained above, the system 108 may flag and restrict such responses to prevent their delivery to the end-user.

Figure 6:
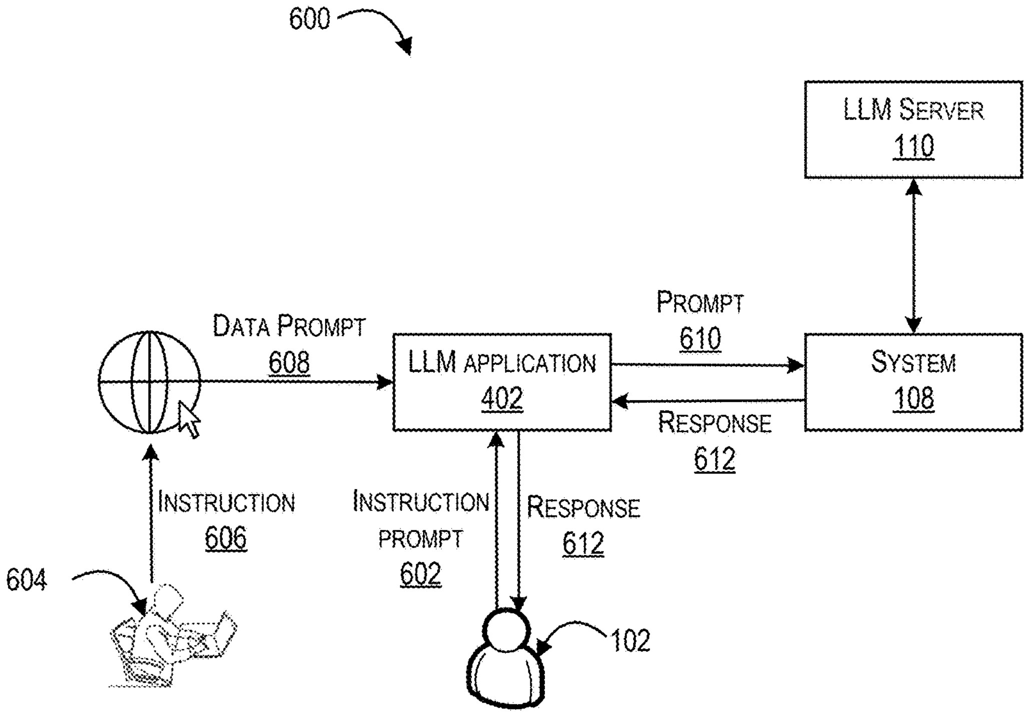
FIG. 6 is a block diagram illustrating an operation of the system, in accordance with an embodiment of the present disclosure.

FIG. 6 is a block diagram 600 illustrating an operation of the system 108, in accordance with an embodiment of the present disclosure. Such an operation may be associated with an environment involving interactions between the users 102, an attacker 604, external servers, and the LLM application 402. As illustrated, the system 108 may protect the LLM server 110 and its applications from malicious exploitation while facilitating legitimate user interactions. In an embodiment, the attacker 604 may initiate potentially harmful activities by sending instructions 606 to an external server. Such instructions may be designed to exploit vulnerabilities within the LLM ecosystem. The external server may act as a conduit for the attacker's objectives, process such instructions and send a data prompt 608 to the LLM application 402. Such data prompt 608 may include malicious inputs such as unauthorized API calls, prompt injection attacks, or instructions designed to elicit harmful responses from the LLM. Further, the user 102 may interact with the LLM application 402 by sending instruction prompts 602 corresponding to represent legitimate queries or tasks intended for processing by the LLM. It may be apparent to a person skilled in the art that the LLM application 402 may process both the user prompts and the prompts originating from the external server, generating corresponding outputs or responses 612.

In order to ensure the security and reliability of operations, the LLM application 402 may be connected to the system 108. For every received prompt, the LLM application 402 may transmit the prompt 610 to the system 108 for evaluation. The system 108 may perform a thorough analysis of these prompts to detect malicious activities, toxic content, plugin vulnerabilities, or sensitive data leaks. By leveraging sophisticated detection models and vulnerability assessment mechanisms, the system 108 may identify potential exploitation risks and flags or blocks problematic prompts before they may be forwarded to the LLM Server 110 for processing. The LLM Server 110, communicatively coupled to the system 108, may process only the sanitized and verified prompts passed by the system 108, ensuring that malicious or harmful inputs are excluded from its operations. After processing, the LLM server 110 may generate a response which is returned to the system 108 for further verification. Additionally, the system 108 evaluates the response for harmful or inappropriate content, private data leaks, or other risks before allowing it to be transmitted back to the LLM application 402. In a scenario, if the response meets all safety criteria, it is delivered to the user or application as a final response 612. Thus, the system 108 focuses on protecting the LLM server 110 from external threats while safeguarding user interactions. By intercepting and analyzing all communication between the LLM application 402 and the LLM server 110, the system 108 ensures that attackers' attempts to exploit the LLM are thwarted, and legitimate users receive safe and reliable responses.

Figure 7:
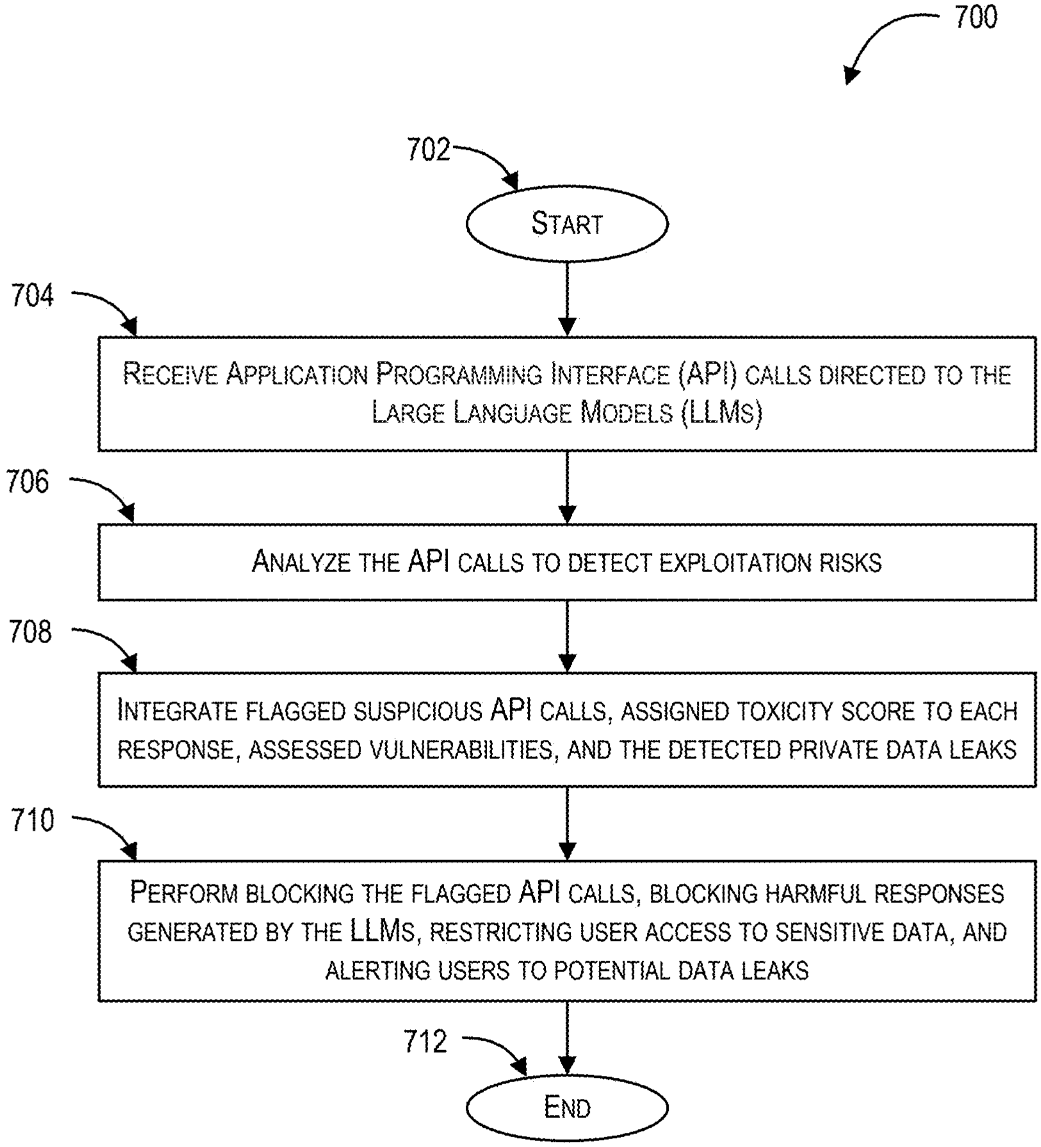
FIG. 7 is a flow chart of a method for preventing exploitation of the LLMs, in accordance with an embodiment of the present disclosure.

FIG. 7 is a flow chart 700 of a method for preventing exploitation of the LLMs, in accordance with an embodiment of the present disclosure. The method starts at step 702.

At first, at step 704, one or more Application Programming Interface (API) calls directed to the one or more LLMs may be received. Such one or more API calls may include a request submitted by a user to the one or more LLMs, and/or a response generated by the one or more LLMs for the user.

Next, the one or more API calls may be analyzed, at step 706, to detect one or more exploitation risks. In an embodiment, the analyzing may further include processing the received one or more API calls to generate feature vectors representing contextual meaning and intent of the corresponding API call for flagging suspicious API calls. The received one or more API calls may be processed using an encoder-only transformer-based model pre-trained using at least prompt injection datasets. Further, the flagging of the suspicious API calls may further include detecting patterns indicative of malicious and unauthorized activities by comparing the generated feature vectors to known malicious patterns derived from prompt injection datasets, and flagging suspicious API calls based at least on the detected malicious patterns and the contextual meaning.

In an embodiment, the analyzing may include the steps of analyzing the received responses generated by the one or more LLMs and assign a toxicity score to each response flag a toxic response. Further, the flagging of the toxicity response may include the steps of analyzing the responses generated by the one or more LLMs for harmful and inappropriate content using a model fine-tuned with labeled datasets of toxic and non-toxic language, extracting features including keywords, tone, and/or inflammatory language to classify the analyzed responses into categories, including toxic, harassment, hate speech, and/or safe. Next, the flagging of the toxicity may include the steps of assigning the toxicity score to each response based on the classification, and comparing the toxicity score of each response with a predefined threshold, such that a response is flagged for further review if the toxicity score exceeds the predefined threshold.

In an embodiment, the analyzing may include the steps of assessing vulnerabilities associated with plugins integrated into the one or more LLMs. Such vulnerabilities may include identifying potential malware exploits and remote code execution vulnerabilities. The method may also identify vulnerabilities related to insecure input handling, insufficient access control, and/or remote code execution in the plugins integrated with the one or more LLMs. Further, the method may include the steps of generating a vulnerability report that includes identified malware exploits and potential mitigation strategies for each assessed plugin.

In an embodiment, the analyzing may include analyzing the received API calls for detecting private data leaks using a detection model trained using datasets including Personally Identifiable Information (PII), proprietary code, and/or proprietary data. Further, the method may use contextual analysis to identify patterns indicative of sensitive information exposure within the received API calls to detect the private data leaks.

Next, flagged suspicious API calls, assigned toxicity score to each response, assessed vulnerabilities, and the detected private data leaks may be integrated, using a vulnerability detection model, at step 708, to generate a comprehensive assessment of the one or more API calls to prioritize detected risks for comprehensive protection of the one or more LLMs. Further, the generated comprehensive assessment may be stored in a database for future analysis and iterative improvements in detecting exploitation risks.

Thereafter, blocking the flagged API calls, blocking harmful responses generated by the one or more LLMs, restricting user access to sensitive data, and/or alerting users to potential data leaks may be performed, at step 710, based on the generated comprehensive assessment of the one or more API calls.

In one embodiment, the method may include the steps of restricting user access to sensitive data by redacting portions of the corresponding generated responses identified as private data. In another embodiment, the method may include the steps of assigning priority levels to the flagged suspicious API calls, harmful responses, and assessed vulnerabilities to optimize mitigation actions. In yet another embodiment, the method may include the steps of blocking flagged API calls based on a predefined threshold of malicious activity. The method may end at step 712.

Figure 8:
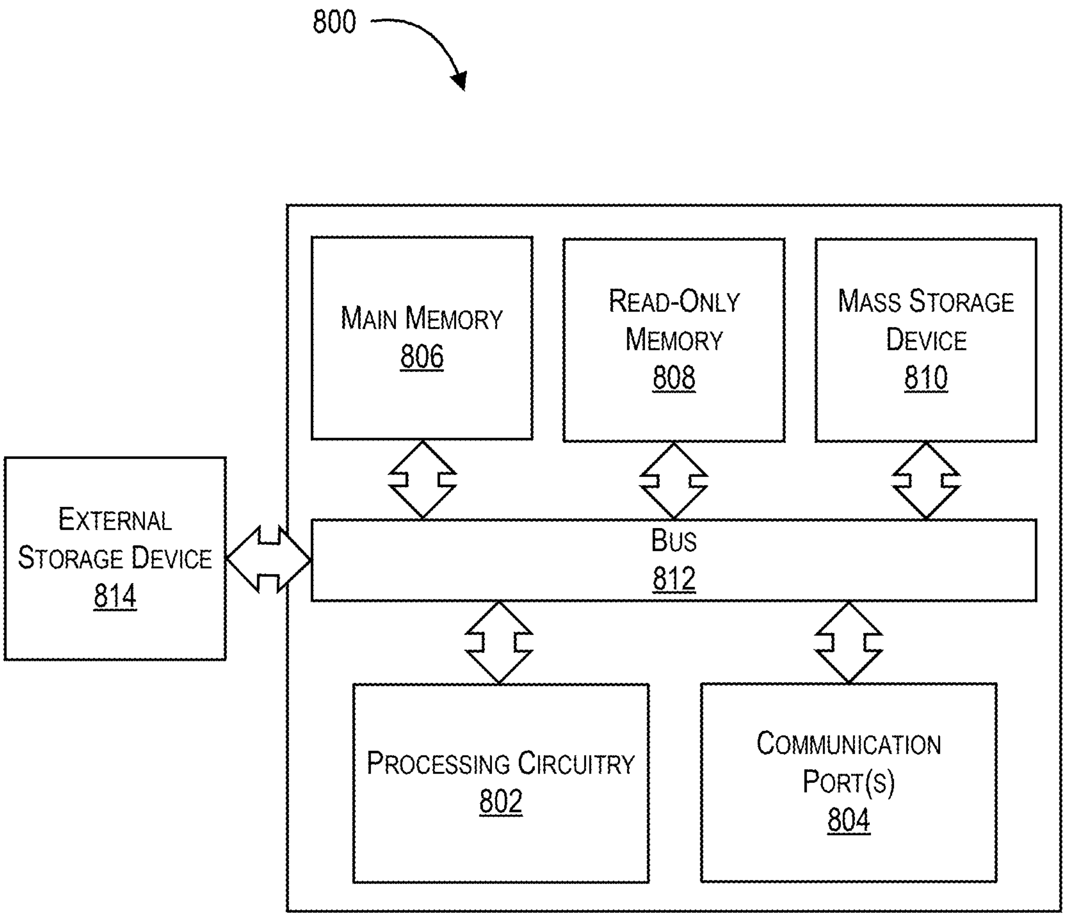
FIG. 8 illustrates an exemplary computer unit in which or with which embodiments of the present disclosure may be utilized.

FIG. 8 illustrates an exemplary computer system in which or with which embodiments of the present disclosure may be utilized. As shown in FIG. 8, a computer system 800 includes an external storage device 814, a bus 812, a main memory 806, a read-only memory 808, a mass storage device 810, a communication port 804, and a processor 802.

Those skilled in the art will appreciate that computer system 800 may include more than one processor 802 and communication ports 804. Examples of processor 802 include, but are not limited to, an Intel® Itanium® or Itanium 2 processor(s), or AMD® Opteron® or Athlon MP® processor(s), Motorola® lines of processors, FortiSOC™ system on chip processors or other future processors. The processor 802 may include various modules associated with embodiments of the present disclosure.

The communication port 804 can be any of an RS-232 port for use with a modem-based dialup connection, a 10/100 Ethernet port, a Gigabit or 10 Gigabit port using copper or fiber, a serial port, a parallel port, or other existing or future ports. The communication port 804 may be chosen depending on a network, such as a Local Area Network (LAN), Wide Area Network (WAN), or any network to which the computer system connects.

The memory 806 can be Random Access Memory (RAM), or any other dynamic storage device commonly known in the art. Read-Only Memory 808 can be any static storage device(s) e.g., but not limited to, a Programmable Read-Only Memory (PROM) chips for storing static information e.g., start-up or BIOS instructions for processor 802.

The mass storage 810 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

The bus 812 communicatively couples processor(s) 802 with the other memory, storage, and communication blocks. The bus 812 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 802 to a software system.

Optionally, operator and administrative interfaces, e.g., a display, keyboard, and a cursor control device, may also be coupled to bus 812 to support direct operator interaction with the computer system. Other operator and administrative interfaces can be provided through network connections connected through communication port 804. An external storage device 810 can be any kind of external hard-drives, floppy drives, IOMEGA® Zip Drives, Compact Disc Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

What is claimed is:

1. A system for preventing exploitation of one or more Large Language Models (LLMs), the system comprising:

a receiving module to receive one or more Application Programming Interface (API) calls directed to the one or more LLMs, wherein the one or more API calls include at least one of: a request submitted by a user to the one or more LLMs, and a response generated by the one or more LLMs for the user;

an analyzer module to analyze the one or more API calls to detect one or more exploitation risks, including:

a malicious pattern detector to process the received one or more API calls to generate feature vectors representing contextual meaning and intent of the corresponding API call for flagging suspicious API calls;

a toxic content detector to analyze the received responses generated by the one or more LLMs and assign a toxicity score to each response to flag a toxic response;

a plugin vulnerability detector to assess vulnerabilities associated with plugins integrated into the one or more LLMs, including identifying potential malware exploits and remote code execution vulnerabilities; and a sensitive data detector to analyze the received API calls for detecting private data leaks using a detection model trained using datasets including at least one of: Personally Identifiable Information (PII), proprietary code, and proprietary data; and an action module to:

integrate, using a vulnerability detection model, the flagged suspicious API calls, the assigned toxicity score to each response, the assessed vulnerabilities, and the detected private data leaks to generate a comprehensive assessment of the one or more API calls to prioritize detected risks for comprehensive protection of the one or more LLMs;

perform at least one of: blocking the flagged API calls, blocking harmful responses generated by the one or more LLMs, restricting user access to sensitive data, and alerting users to potential data leaks based on the generated comprehensive assessment of the one or more API calls.

2. The system of claim 1, wherein the received one or more API calls are processed using an encoder-only transformer-based model pre-trained using at least prompt injection datasets and flagging of the suspicious API calls further comprises:

detecting patterns indicative of malicious and unauthorized activities by comparing the generated feature vectors to known malicious patterns derived from prompt injection datasets; and flagging suspicious API calls based at least on the detected malicious patterns and the contextual meaning.

3. The system of claim 1, wherein flagging the toxicity response further comprises:

analyzing the responses generated by the one or more LLMs for harmful and inappropriate content using a model fine-tuned with labeled datasets of toxic and non-toxic language;

extracting features including at least one of: keywords, tone, and inflammatory language to classify the analyzed responses into categories, including toxic, harassment, hate speech, and safe;

assigning the toxicity score to each response based on the classification; and comparing the toxicity score of each response with a predefined threshold, such that a response is flagged for further review if the toxicity score exceeds the predefined threshold.

4. The system of claim 1, wherein the plugin vulnerability detector further identifies vulnerabilities related to at least one of: insecure input handling, insufficient access control, and remote code execution in the plugins integrated with the one or more LLMs.

5. The system of claim 1, wherein the sensitive data detector uses contextual analysis to identify patterns indicative of sensitive information exposure within the received API calls to detect the private data leaks.

6. The system of claim 1, wherein the plugin vulnerability detector further generates a vulnerability report that includes identified malware exploits and potential mitigation strategies for each assessed plugin.

7. The system of claim 1, wherein the action module blocks flagged API calls based on a predefined threshold of malicious activity.

8. The system of claim 1, wherein the action module restricts user access to sensitive data by redacting portions of the corresponding generated responses identified as private data.

9. The system of claim 1, wherein the action module assigns priority levels to the flagged suspicious API calls, harmful responses, and assessed vulnerabilities to optimize mitigation actions.

10. The system of claim 1, wherein the generated comprehensive assessment is stored in a database for future analysis and iterative improvements in detecting exploitation risks.

11. A method for preventing exploitation of one or more Large Language Models (LLMs), the method comprising:

receiving one or more Application Programming Interface (API) calls directed to the one or more LLMs, wherein the one or more API calls include at least one of: a request submitted by a user to the one or more LLMs, and a response generated by the one or more LLMs for the user;

analyzing the one or more API calls to detect one or more exploitation risks, including:

processing the received one or more API calls to generate feature vectors representing contextual meaning and intent of the corresponding API call for flagging suspicious API calls;

analyzing the received responses generated by the one or more LLMs and assigning a toxicity score to each response to flag a toxic response;

assessing vulnerabilities associated with plugins integrated into the one or more LLMs, including identifying potential malware exploits and remote code execution vulnerabilities; and analyzing the received API calls for detecting private data leaks using a detection model trained using datasets including at least one of: Personally Identifiable Information (PII), proprietary code, and proprietary data; and integrating, using a vulnerability detection model, the flagged suspicious API calls, the assigned toxicity score to each response, the assessed vulnerabilities, and the detected private data leaks to generate a comprehensive assessment of the one or more API calls to prioritize detected risks for comprehensive protection of the one or more LLMs;

perform at least one of: blocking the flagged API calls, blocking harmful responses generated by the one or more LLMs, restricting user access to sensitive data, and alerting users to potential data leaks based on the generated comprehensive assessment of the one or more API calls.

12. The method of claim 11, wherein the received one or more API calls are processed using an encoder-only transformer-based model pre-trained using at least prompt injection datasets and flagging of the suspicious API calls further comprises:

detecting patterns indicative of malicious and unauthorized activities by comparing the generated feature vectors to known malicious patterns derived from prompt injection datasets; and flagging suspicious API calls based at least on the detected malicious patterns and the contextual meaning.

13. The method of claim 11, wherein flagging the toxicity response further comprises:

analyzing the responses generated by the one or more LLMs for harmful and inappropriate content using a model fine-tuned with labeled datasets of toxic and non-toxic language;

extracting features including at least one of: keywords, tone, and inflammatory language to classify the analyzed responses into categories, including toxic, harassment, hate speech, and safe;

assigning the toxicity score to each response based on the classification; and comparing the toxicity score of each response with a predefined threshold, such that a response is flagged for further review if the toxicity score exceeds the predefined threshold.

14. The method of claim 11, further comprises identifying vulnerabilities related to at least one of: insecure input handling, insufficient access control, and remote code execution in the plugins integrated with the one or more LLMs.

15. The method of claim 11, further comprises using contextual analysis to identify patterns indicative of sensitive information exposure within the received API calls to detect the private data leaks.

16. The method of claim 11, further comprises generating a vulnerability report that includes identified malware exploits and potential mitigation strategies for each assessed plugin.

17. The method of claim 11, further comprises blocking flagged API calls based on a predefined threshold of malicious activity.

18. The method of claim 11, further comprises restricting user access to sensitive data by redacting portions of the corresponding generated responses identified as private data.

19. The method of claim 11, further comprises assigning priority levels to the flagged suspicious API calls, harmful responses, and assessed vulnerabilities to optimize mitigation actions.

20. The method of claim 11, wherein the generated comprehensive assessment is stored in a database for future analysis and iterative improvements in detecting exploitation risks.

* * * * *